No. 860,272. PATENTED JULY 16, 1907.
A. A. WARNER.
PERCOLATOR.
APPLICATION FILED NOV. 26, 1906.

Witnesses.
J. H. Clarke
P. J. Egan

Inventor.
Alonzo A. Warner.
By James Shepard
Atty.

UNITED STATES PATENT OFFICE.

ALONZO ABNER WARNER, OF NEW BRITAIN, CONNECTICUT, ASSIGNOR TO LANDERS, FRARY AND CLARK, OF NEW BRITAIN, CONNECTICUT, A CORPORATION.

PERCOLATOR.

No. 860,272.  Specification of Letters Patent.  Patented July 16, 1907.

Application filed November 26, 1906. Serial No. 345,054.

*To all whom it may concern:*

Be it known that I, ALONZO ABNER WARNER, a citizen of the United States, residing at New Britain, in the county of Hartford and State of Connecticut, have invented certain new and useful Improvements in Percolators, of which the following is a specification.

My invention relates to improvements in percolators and the objects of my improvement are to improve the operation of the retainer or spreader for the cup, and to prevent the said retainer from being placed bottom side up in the cup.

Figure 1:
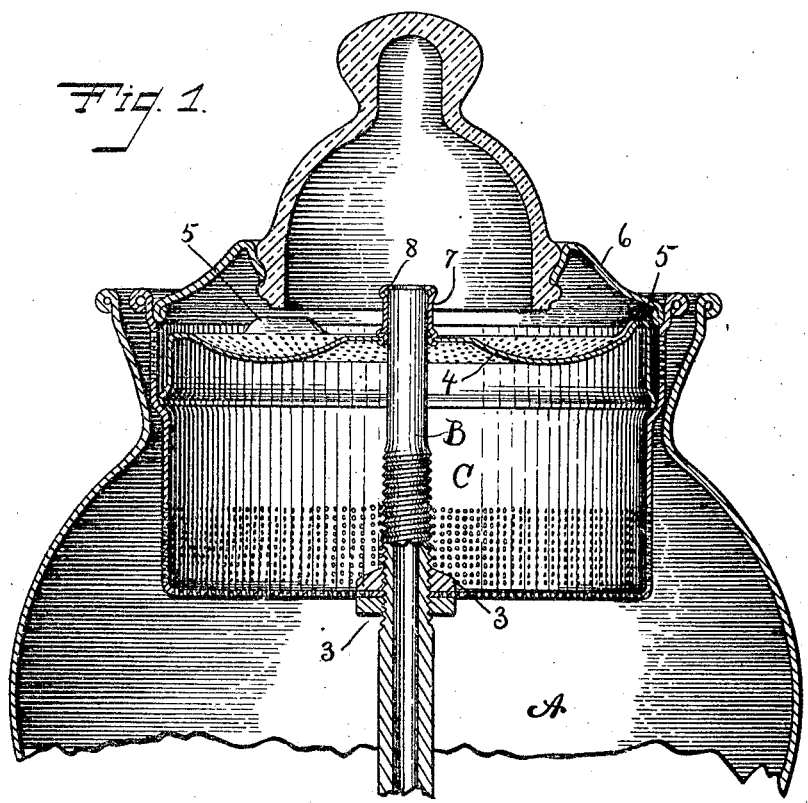
Figure 2:
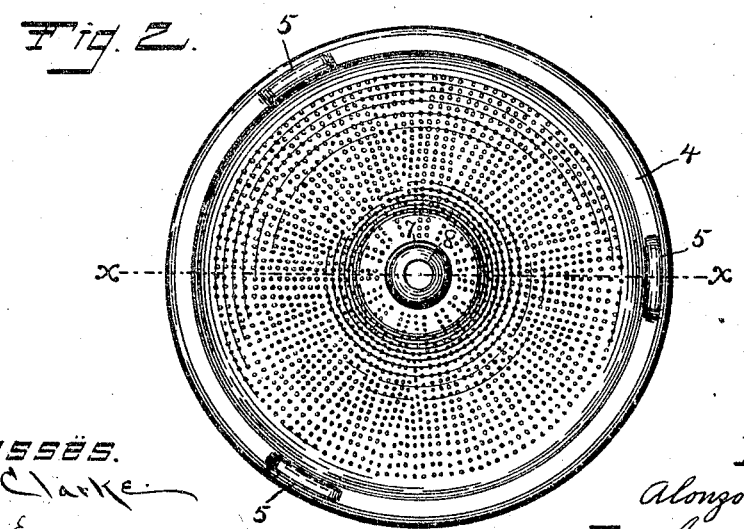

In the accompanying drawing:—Figure 1 is a central vertical section of the upper part of my percolator, on the line $x$ $x$ of Fig. 2, the fountain tube being shown partly in side elevation. Fig. 2 is a detached plan view of the retainer or spreader for the cup.

A, designates the upper portion of a percolator vessel and B is its fountain tube, through which the liquid is forced upwardly by any ordinary devices for that purpose. The fountain tube B is readily detachable from the vessel and I prefer to have the cup C rigidly secured to the said fountain tube by means of the nuts 3, 3. In general the construction of the percolator herein shown is the same as that described and claimed in my Patent No. 821,445, dated May 22, 1906.

All of the present improvements relate to the part called "the retainer" in the aforesaid patent, and to the combination thereof with the other parts. The retainer 4 is so called because it tends to hold the ground coffee within the cup. It is also sometimes called the spreader because the liquid falling upon it from the fountain tube is spread around or distributed over a larger surface in the cup than it would be if the liquid fell directly upon the ground coffee within the cup. The drip cup C is provided with a suitable cover 6, which is seated on the said cup and the retainer or spreader 4 is seated within the upper part of the drip cup with its upper edge in a lower plane than the upper edge of the said cup, so that the spreader or retainer may overflow before the liquid rises high enough to flow over the upper edge of the cup. This retainer or spreader 4 is provided at its upper side near its edge with three lugs or projections 5 that extend up above the rest of the said edge. These lugs are covered by the cover 6 that fits into the upper part of the cup C, as shown. Sometimes the spreader or retainer is forced upwardly by the action of the percolator or its contents, in which case the lugs 5 come in contact with the underside of the cover 6, but inasmuch as the upper edge of the spreader or retainer 4 between the lugs 5 is lower than the top of the said lugs, there is always an open space between the rim of the spreader or retainer and the cover, so that any excess of liquid may escape through the open space between the lugs. This retainer or spreader is designed especially to take care of the liquid that flows over its edge, when more liquid is forced up than can flow through the retainer, all as described in my aforesaid patent.

The retainer or spreader 4 is, like that in my said patent, provided with a central tube 7 that receives into it the upper end of the fountain tube B, but in the present case I provide the upper end of the said central tube 7 with an inturned flange 8, the opening through the said tube 7 inside of the said flange 8 being a little less in diameter than the upper end of the fountain tube B. The upper end of the said fountain tube B extends up through the body of the retainer 4 and into the central tube 7 to the flange 8, or nearly to the said flange. It will therefore be seen that it is impossible for any one to put the retainer on when it is bottom side up, because it is impossible to pass the upper end of the fountain tube through the flange 8 of the central tube 7 of the retainer, while the fountain tube extends so high up that the retainer cannot be placed within the cup without entering the fountain tube into the central tube of the retainer.

I claim as my invention:—

1. In a percolator, the combination of a drip cup with a cover seated on the said cup, a fountain tube extending upwardly through the drip cup for delivering liquid thereto, and a retainer or spreader fitted within the upper part of the said cup to receive the liquid that is delivered from the said fountain tube and with its upper edge in a lower plane than the upper edge of the said cup in order to provide an overflow of the said retainer without an overflow of the said cup, the said retainer having upwardly projecting lugs at its overflow edge for engaging the underside of the said cover.

2. In a percolator, the combination of a drip cup with a fountain tube extending upwardly therethrough, a retainer or spreader at the upper part of the said cup, and a central tube mounted on the said retainer and adapted to receive within it the upper end of the said fountain tube, the opening at the upper end of the said central tube of the retainer being of a smaller diameter than the external diameter of the said fountain tube, whereby it is impossible to place the retainer in the cup wrong side up.

ALONZO ABNER WARNER.

Witnesses:
ERNEST TWIGG,
ARTHUR J. NORTHROP, Jr.